April 17, 1956 C. G. SONTHEIMER 2,742,613

VARIABLE TIME DELAY SYSTEM

Filed July 26, 1951

Inventor
CARL G. SONTHEIMER

By

Curtis, Morris & Safford.
Attorneys 2,742,613
Patented Apr. 17, 1956

2,742,613

VARIABLE TIME DELAY SYSTEM

Carl G. Sontheimer, Riverside, Conn., assignor to C. G. S. Laboratories, Inc., Stamford, Conn., a corporation of Connecticut Application July 26, 1951, Serial No. 238,666

2 Claims. (Cl. 333—29)

This invention relates to time sensitive and frequency responsive electrical networks. More particularly, it relates to variable time delay networks which can be controlled by varying the intensity of a control current.

Artificial transmission lines and similar networks generally include a number of lumped inductive elements and a number of lumped capacitive elements with appropriate input and output circuits. Such time and frequency responsive networks are used in phasing devices, signaling systems, pulse measuring and formation systems, directional reception and propagation of energy, and for many other and widely varied purposes. The use of such networks has been limited, however, because the delay characteristics are fixed so that to change the characteristics it was necessary to resort to one of various switching or substituting arrangements. Accordingly, it is desirable to provide such a network in which the delay characteristics can be varied continuously, preferably over a relatively wide range.

Such variation might be attained by using mechanically variable condensers, but this is impractical because it is difficult to gang a large number of condensers for simultaneous adjustment and because the capacitance values and voltage breakdown requirements ordinarily are such that the condensers would be so large physically as to be impractical.

The desired variation could also be attained by varying the values of the inductive elements by mechanical adjustment, as by moving the ferromagnetic cores. Here again the problem of ganging the moving parts for simultaneous adjustment renders the arrangement impractical for most uses.

Moreover, in any system requiring physically movable components, the rate at which the characteristics can be varied is limited by the inertia of the moving parts.

In accordance with the present invention, an auxiliary control current is passed through the inductive windings so as to partially saturate the cores of the inductive windings thereby varying the effective inductance of the windings and producing the desired change in delay characteristics.

In a preferred embodiment of the invention, the use of ferromagnetic ceramic core material in the inductances makes possible a large variation in delay characteristics. Moreover, the same winding is used for the signal and for controlling the saturation of the core so that a simple electrical structure suffices to accomplish the desired objects.

Such networks can be controlled readily, even from remote locations, and rapid variation in the characteristics can be obtained. The latter feature is of particular importance in applications where it is desired to continuously and rapidly vary the characteristics over a wide range, as in the scanning operations of radar and sonar systems.

These and other objects and advantages of the invention will be in part pointed out in and in part apparent from the following description considered in connection with the following drawings in which.

Figure 1:
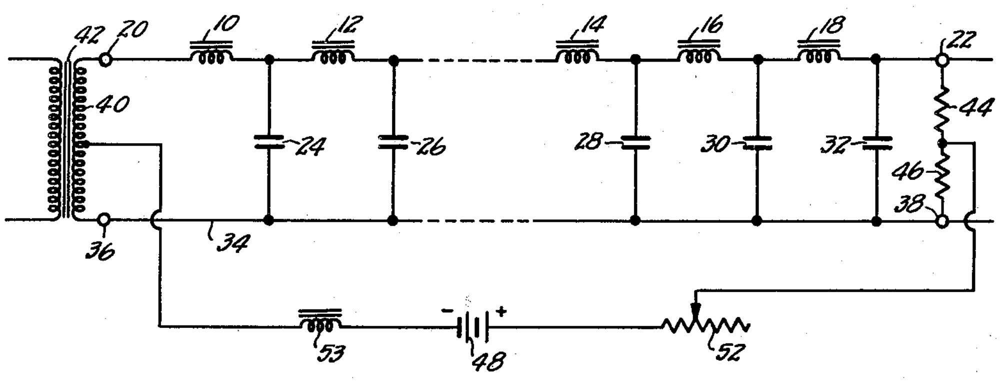
Figure 1 is a schematic diagram of an artificial transmission line embodying the invention.

As shown in Figure 1, any desired number of inductive windings, as indicated at 10, 12, 14, 16 and 18, having ferromagnetic cores, are connected in series between an input terminal 20 and an output terminal 22. A similar number of capacitive reactors, as indicated at 24, 26, 28, 30 and 32, are connected across the line from respective points between each of the inductors to the opposite side of the line which is joined by a conductor 34 that extends from an input terminal 36 to an output terminal 38.

The input terminals 20 and 36 of the line are connected to opposite ends of a center-tapped secondary winding 40 of an input transformer 42. Opposite ends of two isolating resistors 44 and 46 are connected in series between the output terminals 22 and 38 of the line.

In order to vary the saturation of the cores of the inductive reactors, one terminal of a source of direct current, such as a battery 48, is connected through a variable resistor 52 to the junction of the resistors 44 and 46. The opposite battery terminal is connected through an isolation choke 53 to the center tap of the transformer winding 40.

In operation, the control current flows from battery 48 to the center-tapped secondary winding 40 where it divides, part going through the upper part of the secondary winding through the inductors 10, 12, 14, 16, and 18, through the resistor, and the variable resistor 52, to the other terminal of the battery 48. Part of the current also travels from the center tap of the winding 40 through the lower half of this winding, the conductor 34, through the resistor 46, and the variable resistor 52 to the battery 48.

This direct current flowing through the inductors partially saturates the cores of the inductive windings. Since the inductance of such windings varies with the degree of saturation, this current determines the inductance of each of the windings 10, 12, 14, 16 and 18. As the inductive windings are connected in series and are substantially identical, the same current will flow through each producing an equal change in inductance in each of the windings. By varying the resistor 52 the direct current through the windings and thus the inductive effect is varied, producing a change in the characteristics of the line.

The resistors 44 and 46 may be chosen so that the current flowing through each side of the artificial line will be equal and thereby create a minimum of unbalance in the signal circuit. The values of resistors 44 and 46 are high enough to provide the degree of isolation between the signal and control circuits that is required for the particular application. For example, with a delay line having a characteristic impedance of 50 ohms, the resistors 44 and 46 may have a value of the order of 500 ohms. The resistors 44 and 46 may serve also as a terminating element for the artificial line and have a total resistance equal to the characteristic impedance of the line.

It is apparent that other arrangements can be used for isolating the signal and control circuits from each other. For example, a transformer such as the transformer 42 can be used also at the output end of the line instead of the resistors 44 and 46. Choke coils or other elements offering a relatively high impedance to the flow of signal currents may be used to replace the resistors 44 and 46 or the center-tapped transformer winding 40. Moreover, the control current may be passed only through the inductive windings and not through the conductors 34. Thus, the source of control current may be coupled through suitable isolating impedances to the terminals 20 and 22, the resistors 44 and 46 and the connection to the center tap of winding 40 being omitted.

It is apparent also that artificial lines and time sensitive networks are arranged in many different forms depending upon the requirements of the particular application. Thus, in some arrangements it may be necessary to divide the inductive windings into two or even more groups and to provide separate circuits for coupling the control current to these windings.

In some instances, the inductive windings may not be identical, therefore making it desirable to divide various portions of the network by coupling condensers, or other means, so that separate control currents of different magnitudes may be utilized. In other instances, it may be desirable to compensate for the difference in windings by the use of cores of different sizes or shapes or composed of materials having different saturation characteristics.

Figure 2:
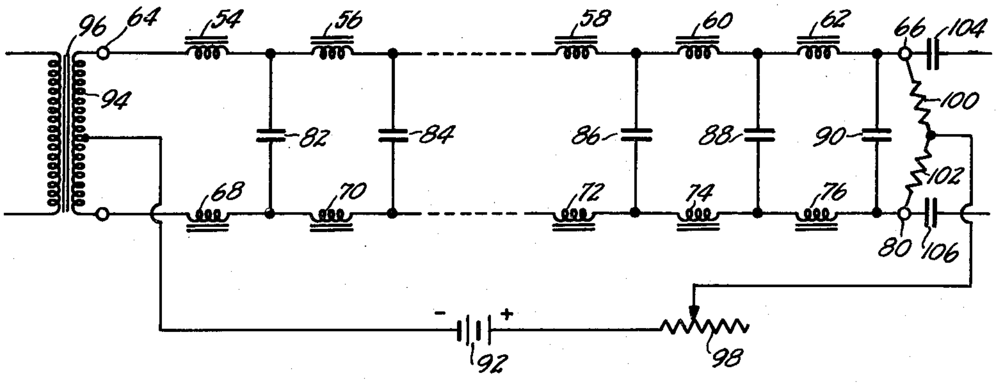
Figure 2 is a schematic diagram of another embodiment of the invention.

Figure 2 shows a differently arranged artificial transmission line in which a better line balance is attained. A number of inductive reactors 54, 56, 58, 60 and 62 are connected in series between an input terminal 64 and an output terminal 66 to form one side of the artificial line, and a second group of inductors 68, 70, 72, 74 and 76 are connected in series between the other input and output terminals 78 and 80 to form the other side of the artificial line. Capacitive reactors 82, 84, 86, 88 and 90 are connected across the line between the junctions of adjacent inductors.

In order to control the reactance values of the inductors in this line, one terminal of a battery 92 is connected to the center tap of a secondary transformer winding 94 of a tranformer 96. The other terminal of this battery is connected through a variable resistor 98 to the junction of two equal value resistors 100 and 102 connected in series between the output terminals 66 and 80.

With this arrangement, the control current from battery 92 divides to produce equal control currents in each side of the artificial line. As before, the delay time of the line is varied by adjustment of the movable contact of the resistor 98.

Coupling condensers 104 and 106 may be connected to the output terminals 66 and 80 to block the control current from the load circuit.

It may in some instances be desirable to use an alternating control current to produce a predetermined periodically varying delay characteristic. In such instances, it is desirable to utilize a direct current bias of sufficient magnitude that the direction of flow of the control current in the inductive windings never actually reverses.

Figure 3:
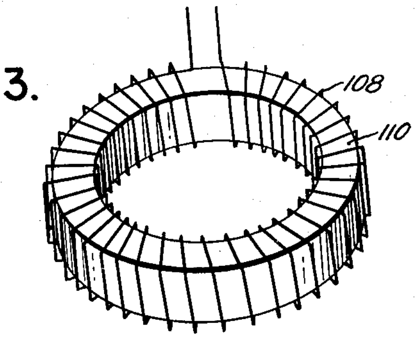
Figure 3 is a perspective view of a preferred type inductive element for use in such networks.

The inductive reactors of both Figures 1 and 2 preferably are formed in the shape of a toroid as shown in Figure 3. An inductive winding 108 is wound on a toroidal core 110 as shown. This core is made of a ferromagnetic ceramic material, sometimes called "ferrite," such as is described in U. S. Patents 2,452,529, 2,452,530 and 2,452,531 to Snoek. These ferromagnetic ferrites are compounds of various metal oxides and, for example, may have the general formula $MOFe_2O_3$, where "M" stands for a bivalent metal ion such as nickel, zinc, magnesium, and others. Physically, they are crystalline materials having a spinel structure. They are sold by General Ceramics and Steatite Corporation, Keasbey, New Jersey, under the trade name "Ferramic."

Such materials have the advantage that large changes in inductance are produced by varying the magnitude of the control current. For example, an inductance change of 200 to one can be obtained readily.

The characteristic or surge impedance of a line of this type will of necessity vary with a change in the value of either the inductive or capacitive elements of the line. The characteristic impedance "$Z_0$" of an artificial transmission line, neglecting losses not here important, is generally represented by the formula $$\sqrt{\frac{L}{C}}$$

where "L" is the inductance of the line and "C" the capacitance of the line. Consequently a change in inductance causes a change in the characteristic. The impedance terminations of the line can be improved by using transformer coupling for both the input and output circuits and constructing the transformer cores of the same material as the inductor cores so that the impedance of the transformer windings varies with change in control current.

While I have chosen as an illustrative embodiment of the present invention a variable delay line, it should be understood that this is not intended to be exhaustive or to be limiting of the invention. On the contrary, this illustration and the explanations herein are given in order to acquaint others skilled in the art with this invention and the principles thereof and a suitable manner of its aplication in practical use, so that others skilled in the art may be enabled to modify the invention and to adapt it and apply it in numerous forms, each as may be best suited to the requirements of a particular use.

What is claimed is:

1. A balanced electrically variable delay line including a pair of input terminals and a pair of output terminals, a first center-tapped impedance element connected across said input terminals, a second center-tapped impedance element connected across said output terminals, a first circuit branch connected between said first input and first output terminal, said first circuit branch having a continuous direct current path therethrough from the center-tap on said first impedance element to the center-tap on said second impedance element and including a plurality of lumped inductance elements having magnetically saturable ferramognetic cores, a second circuit branch connected between said second input and second output terminal, said second circuit branch having a continuous direct current path therethrough from the center tap on said first impedance element to the center tap on said second impedance element and including a plurality of lumped inductance elements having magnetically saturable cores, a plurality of condensers connected between respective electrically spaced points along said first and second circuit branches, and a direct current control circuit connected between the center tap on said first impedance element and the center tap on said second impedance element, said control circuit including a source of direct current and a variable resistor for varying the magnitude of the direct current in said circuit, whereby equal portions of the control current flow through said first and second circuit branches for controlling the reactance values of the lumped inductance elements therein to vary the delay time of said line and whereby said delay line is maintained in balanced condition for all periods of delay.

2. A balanced electrically-variable delay line including a pair of input terminals and a pair of output terminals, an input transformer having a secondary winding connected across said input terminals, a center tap on said secondary winding, a center-tapped resistance connected across said first and second output terminals, a first circuit branch of said delay line connected between said first input and first output terminals, said first circuit branch including a plurality of lumped inductance elements having magnetically saturable ferromagnetic cores, said first circuit branch providing a direct current path from said first input to said first output terminal, a second circuit branch of said delay line connected between said second input and second output terminals, said second circuit branch including a plurality of lumped inductance elements having magnetically saturable ferromagnetic cores, said second circuit branch providing a direct current path from said second input to said second output terminal, a plurality of condensers connected between respective electrically spaced points along said first and second circuit branches, and a direct current control circuit connected between the center tap on said secondary winding and the center tap on said resistance, said control circuit including a source of direct current and a variable resistor for varying the magnitude of the direct current in said circuit, whereby said delay line is balanced and equal portions of the control current flow through said first and second circuit branches for varying the reactance values of the lumped inductance elements therein for varying the delay time of said line while maintaining said delay line in balanced condition.

References Cited in the file of this patent

UNITED STATES PATENTS

| | | |
|---|---|---|
| 1,907,147 | Dudley | May 2, 1933 |
| 1,971,688 | Lange | Aug. 28, 1934 |
| 2,085,639 | Cowan | June 29, 1937 |
| 2,362,294 | Mittag | Nov. 7, 1944 |
| 2,445,783 | Labin | July 27, 1948 |
| 2,565,231 | Hepp | Aug. 21, 1951 |
| 2,569,309 | Hepp | Sept. 25, 1951 |
| 2,650,350 | Heath | Aug. 25, 1953 |

FOREIGN PATENTS

| | | |
|---|---|---|
| 555,004 | Great Britain | July 29, 1943 |